Oct. 17, 1939.　　W. KIERSTED, JR　　2,176,429
PROCESS AND APPARATUS FOR COUNTERCURRENT TREATMENT
Filed May 25, 1938
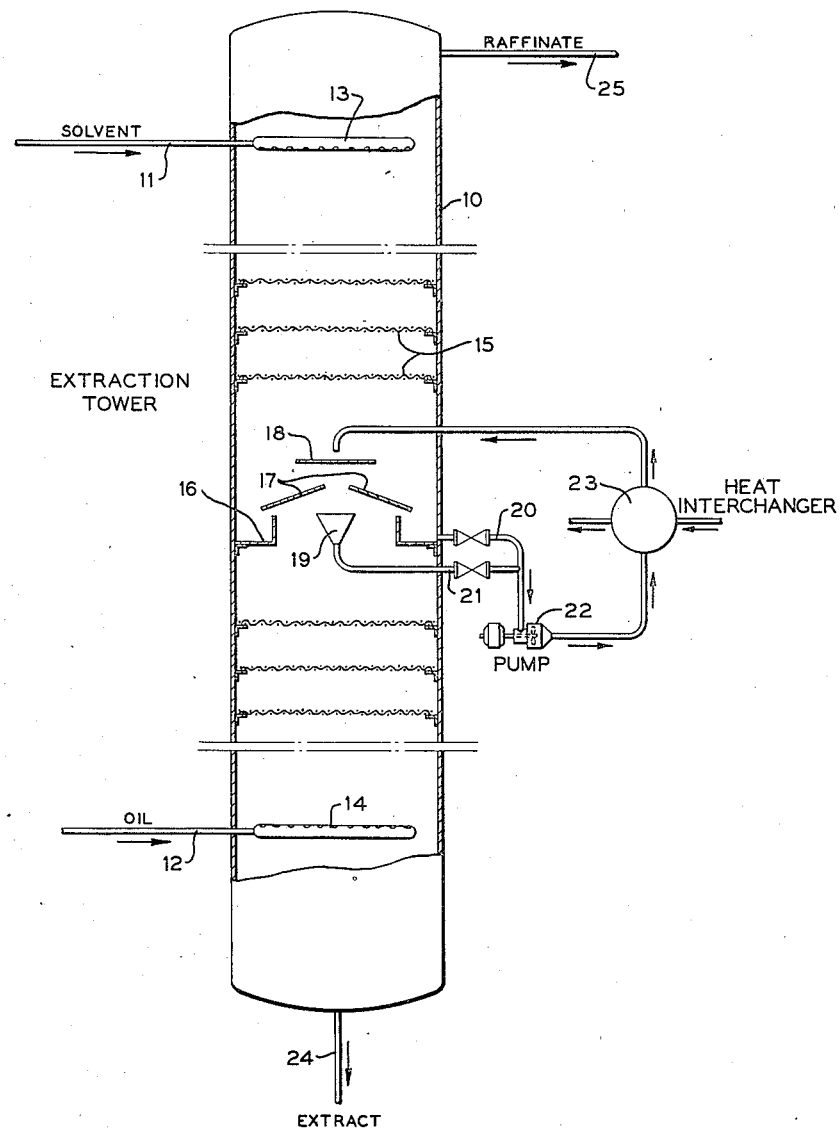
WYNKOOP KIERSTED, JR.
INVENTOR
BY R. J. Dearborn
Daniel Stryker
ATTORNEY Patented Oct. 17, 1939

2,176,429

UNITED STATES PATENT OFFICE 2,176,429

PROCESS AND APPARATUS FOR COUNTERCURRENT TREATMENT

Wynkoop Kiersted, Jr., Scarsdale, N. Y., assignor to The Texas Company, New York, N. Y., a corporation of Delaware Application May 25, 1938, Serial No. 209,911

5 Claims. (Cl. 196—13)

This invention relates to apparatus for a method of treating one liquid countercurrently with another. It has particular reference to the countercurrent treatment of hydrocarbon oils with a liquid, such as a selective solvent.

The invention broadly contemplates effecting countercurrent treatment of liquids in a packed tower, wherein at successive points in the tower the liquid phases are separated, subjected to mixing, and returned to the tower at or near the point of separation, as will be more fully described.

In the treatment of hydrocarbon oil, such as mineral lubricating oil, for example, with a selective solvent, such as furfural, the oil is introduced to the lower portion of a packed tower, while the solvent is introduced to the upper portion thereof. Oil and solvent move countercurrently through the tower, and in doing so form within the tower extract and raffinate phases. The extract phase is rich in aromatic and naphthenic type constituents of the oil and accumulates in the bottom of the tower, from which it is continuously withdrawn.

The raffinate phase, on the other hand, comprises the more paraffinic and insoluble constituents of the oil mixed with a small proportion of the solvent. This raffinate phase accumulates in the upper portion of the tower and is continuously withdrawn therefrom.

The present invention involves providing, at intervals within the tower, preferably between succeeding sections of packing material, means for separating extract and raffinate phase liquid, subjecting it to intimate mixing, and returning it to the extraction tower after heating or cooling, if necessary.

By these means, close control of the contact between oil and solvent is effected. The overall effect is to produce within the extraction tower conditions somewhat similar to those prevailing in a stage counterflow operation, as carried out in a series of separate mixing and settling vessels.

The purpose of the invention, therefore, is to combine in a countercurrent extraction system the simplicity of operation permitted in a conventional packed tower and the extractive efficiency of a stage operation.

Reference will now be had to the accompanying drawing in order to further describe the invention.

In the drawing, the numeral 10 designates a vertical cylindrical vessel to which a solvent, such as furfural, is introduced through an inlet 11 in the upper portion of the tower, while the oil to be treated is introduced through an inlet 12 near the bottom. Sprays, or other distributing means, 13 and 14 are positioned within the tower through which the solvent and oil, respectively, are distributed through the packing material.

The packing advantageously consists of screens 15, spaced at intervals throughout the length of the tower. As indicated, the spacing between each set of three or more screens may be increased so that it is greater than the distance between the individual screens in each section.

It is contemplated, however, that instead of screens the packing may take some other form. For example, it may consist of nests of Raschig rings, or other material commonly used as packing material, and which exposes a large surface area of contact. If desired, a combination of screens and Raschig rings may be employed. In such case, each section of packing may consist of three screens, spaced a short distance apart, with the intervening spaces filled with Raschig rings.

Within the enlarged spaces between each section of packing an annular channel or trough 16 extends around the interior wall of the vessel 10, and which is adapted to catch and retain liquid flowing into it from a conical baffle 17. This trough advantageously has an inside area equal to about 50% of the cross-sectional area of the tower.

The baffle 17 is provided with an orifice at its vertex and its outer peripheral edge extends substantially above and partially over the inner edge of the channel 16.

A disk baffle 18 is horizontally disposed a short distance above the orifice in the conical baffle 17.

A bell mouth or funnel type suction element 19 is located below the conical baffle 17 and positioned so as to provide a drawoff for liquid accumulating within the vertex of the conical baffle 17.

A valved pipe 20 is provided for withdrawing from the tower liquid accumulating in the trough 16. Similarly, a valved pipe 21 is provided for drawing off liquid collecting in the funnel 19. These pipes lead to the suction side of a pump 22, which acts as a mixer for the liquids drawn into this suction, and which discharges the mixed liquids through a heat interchanger 23 to the interior of the tower at a point just above the disk baffle 18.

The phase liquid collecting in the trough 16 comprises mainly extract phase or heavy gravity material rich in solvent, while that flowing into the funnel 19 comprises raffinate phase or lighter gravity material rich in oil. Thus, the arrangement of baffling is such that these phases may be collected separately at successive points in the tower and drawn off for intimate mixing. The baffle 18 prevents short-circuiting of the mixed phases upon their return to the tower.

These liquid phases may be drawn off through the pipes 20 and 21 in any desired proportion.

Thus, in these circulating mixtures, the ratio of extraction solvent to oil may be maintained substantially greater than that existing between the fresh solvent and fresh oil being charged to the terminal portions of the extraction tower. This permits realizing greater extractive efficiency.

The heat interchanger 23 is employed to either increase the temperature or reduce the temperature of the mixture being returned to the tower. For example, where it is desired to maintain a temperature gradient from top to bottom within the tower, the interchangers at the upper portions of the tower may be used to heat the mixture passing therethrough, while the interchangers at lower points may be used to cool the returning liquid.

The tower is advantageously provided with settling spaces in the upper and lowermost portions. The ultimate extract phase, comprising solvent containing dissolved constituents of the oil, is withdrawn from the bottom of the tower through a pipe 24, while the ultimate raffinate phase is drawn off from the top of the tower through a pipe 25.

In operation, the oil to be treated may be introduced at or at somewhat above normal temperature, while the solvent is introduced to the upper portion of the tower at a substantially elevated temperature. Thus, when employing furfural as the solvent the temperature at the top of the tower may range from 200 to 300° F., while at the bottom of the tower it may range around 100 to 150° F.

It is contemplated that other selective solvents besides furfural may be employed as, for example, phenol, nitrobenzene, aniline, benzaldehyde, etc.

The oil treated in the tower may comprise lubricating oil stocks or other petroleum fractions.

Obviously, many modifications and variations of the invention, as hereinbefore set forth, may be made without departing from the spirit and scope thereof, and therefore only such limitations should be imposed as are indicated in the appended claims.

I claim:

1. In the countercurrent treatment of hydrocarbon oil with a solvent to extract from the oil undesired constituents, the method comprising passing the oil through a vertical tower provided with a plurality of sections of packing spaced vertically apart, one above the other, and containing collecting means between succeeding sections for separately collecting extract and raffinate phase liquids, moving a solvent through said tower countercurrently to the oil, withdrawing extract and raffinate phase liquids accumulating in the spaced portions between succeeding sections of packing, mixing said liquids in proportions such that the ratio of extraction solvent to oil is substantially greater than that existing beween the fresh solvent and oil entering the terminals of the tower, adjusting the temperatures thereof, and returning the thus conditioned mixture to the same spaced portion of the tower from which withdrawn.

2. In the countercurrent treatment of hydrocarbon oil with a solvent to extract from the oil undesired constituents, the method comprising passing the oil through a vertical tower provided with a plurality of sections of packing spaced vertically apart, one above the other, and containing collecting means between succeeding sections for separately collecting extract and raffinate phase liquids, moving a solvent through said tower countercurrently to the oil, separately withdrawing extract and raffinate phase liquids accumulating in the spaced portions between succeeding sections of packing, re-mixing said liquids in proportion such that the ratio of extraction solvent to oil is substantially greater than that existing between the fresh solvent and oil entering the terminals of the tower, and returning the thus mixed liquid to the same spaced portion of the tower from which withdrawn.

3. In the countercurrent treatment of hydrocarbon oil with a solvent to separate the oil into extract and raffinate phases, the method comprising passing the oil through a packed vertical tower, at vertical intervals throughout the tower segregating the oil and solvent into extract and raffinate phases, each corresponding extract and raffinate phase being formed at substantially the same elevation within the tower, separately withdrawing the segregated phases, re-mixing the corresponding extract and raffinate phases in proportion such that the ratio of extraction solvent to oil is substantially different from that existing between the fresh solvent and oil entering the terminals of the tower and returning each resulting mixture to substantially the same point within the tower from which withdrawn.

4. In a packed tower for effecting countercurrent contact between mineral oil and a selective solvent the combination comprising a plurality of enlarged settling spaces at vertical intervals throughout the tower between sections of packing material, means for separating within each settling space and at substantially the same level within the tower a light gravity phase and a heavy gravity phase, means for separately withdrawing in predetermined proportions said light and heavy phases separated at each level, means for intimately re-mixing the phases withdrawn from each level, and means for returning the resulting mixture to the same settling space from which withdrawn.

5. In a vertical tower for the countercurrent treatment of oil with a solvent the combination comprising a vertical vessel packed with contact packing material and arranged for countercurrent flow of oil and solvent therethrough, a plurality of enlarged settling spaces at intervals throughout the vessel between sections of packing material, means for separating within and separately withdrawing from each settling space a light gravity liquid and a heavy gravity liquid, said means comprising an annular trough extending horizontally around the interior wall of said vessel, a conical baffle surmounting each trough having its outer peripheral edge extending substantially above and beyond the inner edge of the trough, an orifice in the vertex of said conical baffle, an imperforate disk baffle horizontally disposed above the orifice and spaced a short distance apart therefrom, a receptacle positioned beneath the conical baffle a short distance below the orifice adapted to receive liquid accumulating in the immediate region of the orifice, a conduit communicating between said receptacle and the exterior of the vessel, a separate conduit communicating between the trough and the exterior of the vessel, means exterior of the vessel in communication with both said conduits for mixing the liquids passing through said conduits, and means for returning the mixed liquids back to the interior of the vessel at a point just above the disk baffle.

WYNKOOP KIERSTED, Jr.